(12) United States Patent
Richey et al.

(10) Patent No.: US 11,293,565 B2
(45) Date of Patent: Apr. 5, 2022

(54) PRESSURE AIRLOCK

(71) Applicant: ILLINOIS TOOL WORKS INC., Glenview, IL (US)

(72) Inventors: Stephen E. Richey, Atascadero, CA (US); Carey C. Costle, Tucson, AZ (US); Grant P. Ojeda, Arroyo Grande, CA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 111 days.

(21) Appl. No.: 16/669,080

(22) Filed: Oct. 30, 2019

(65) Prior Publication Data

US 2020/0141516 A1 May 7, 2020

Related U.S. Application Data

(60) Provisional application No. 62/754,277, filed on Nov. 1, 2018.

(51) Int. Cl.
*F16K 47/08* (2006.01)

(52) U.S. Cl.
CPC .................................. *F16K 47/08* (2013.01)

(58) Field of Classification Search
CPC ...................................................... F16K 47/08
USPC ............................ 141/38; 137/223, 227, 231
See application file for complete search history.

(56) References Cited

U.S. PATENT DOCUMENTS

| | | | |
|---|---|---|---|
| 7,284,419 B2 | 10/2007 | Rutherford | |
| 7,565,832 B2 | 7/2009 | Huang | |
| 7,743,652 B1 | 6/2010 | Huang | |
| 7,866,335 B2 * | 1/2011 | Wang | ...................... F16K 15/20 137/231 |
| 8,156,955 B2 | 4/2012 | Wang | |
| 8,245,722 B2 * | 8/2012 | Huang | .................. F04B 33/005 137/223 |
| 8,360,090 B2 | 1/2013 | Wang | |
| 8,402,987 B2 | 3/2013 | Wang | |
| 8,839,809 B1 * | 9/2014 | Wang | ..................... F04B 33/005 137/223 |
| 9,016,304 B2 * | 4/2015 | Wang | ..................... F04B 33/005 137/223 |
| 9,133,970 B2 * | 9/2015 | Wang | ...................... F16K 3/267 |
| 9,375,985 B2 | 6/2016 | Hennig et al. | |
| 9,664,314 B2 | 5/2017 | Chu | |

(Continued)

OTHER PUBLICATIONS

U.S. Patent Office, English language version of the International Search Report, Form PCT/ISA/210 for International Application PCT/US2019/059187, dated Jan. 24, 2020 (4 pages).

(Continued)

*Primary Examiner* — Timothy L Maust
(74) *Attorney, Agent, or Firm* — Pauley Erickson & Swanson

(57) ABSTRACT

A pressure airlock for an inflator or a gauge for use with a valve stem having exterior threads and a valve core, the pressure airlock including a conduit in fluid communication with the inflator or the gauge. A tip extends from the conduit and includes a bore. A core depressor is positioned within the bore and an inner shoulder surrounds the core depressor. An outer shoulder extends from the inner shoulder and extends beyond the core depressor. A seal is positioned on the inner shoulder and the outer shoulder and extends within the tip.

17 Claims, 3 Drawing Sheets

(56) References Cited

U.S. PATENT DOCUMENTS

| | | |
|---|---|---|
| 9,784,634 B2 | 10/2017 | Yamada |
| 9,989,180 B2 * | 6/2018 | Wang ...................... F04B 33/00 |
| 2014/0190576 A1 | 7/2014 | Wang |
| 2017/0276277 A1 | 9/2017 | Wang |
| 2017/0276278 A1 | 9/2017 | Wang |
| 2017/0361667 A1 | 12/2017 | Foor |
| 2018/0009278 A1 | 1/2018 | Foor et al. |

OTHER PUBLICATIONS

U.S. Patent Office, English language version of the Written Opinion of the ISA, Form PCT/ISA/237 for International Application PCT/US2019/059187, dated Jan. 24, 2020 (10 pages).

* cited by examiner

PRESSURE AIRLOCK

CROSS REFERENCE TO RELATED APPLICATION

This application claims the benefit of U.S. Provisional Application Ser. No. 62/754,277, filed on 1 Nov. 2018. This U.S. Provisional Application is hereby incorporated by reference herein in its entirety and are made a part hereof, including but not limited to those portions which specifically appear hereinafter.

BACKGROUND OF THE INVENTION

Field of the Invention

The invention relates to a pressure airlock for a gauge or an inflator.

Description of Prior Art

A typical interface in a gauge or inflator in the prior art includes a face seal within the valve interface to seal against the valve stem. The seal is easily broken or not maintained when the valve face does not make consistent planar contact with the seal, causing escaping air. The escaping ("hissing") air can lead to inaccurate pressure readings, inefficient inflation and/or customer confusion on proper product use and/or function.

SUMMARY OF THE INVENTION

A pressure airlock contemplated by the subject invention includes one of two configurations. In a first configuration, a single (one piece) seal is formed in such a manner that when a valve stein enters the seal, the seal will make contact with the threads of the valve stem, creating a sealing area, and as the valve stem continues to move deeper into the seal, it will make contact with a perpendicular surface of the seal positioned on an inner shoulder of the pressure airlock. This creates a seal on the end or face of the valve stem as well. The combination of these sealing areas defines the pressure airlock as described. In this manner, the "hissing" of a typical such engagement is avoided.

In an alternative configuration, a combination of two separate seals is used to accomplish the same sealing arrangement as noted in the first configuration. The two seals preferably perform the same function as a one-piece seal but would permit different seal hardness options for optimum user "feel" during product usage. In addition, or alternatively, two different seals would permit use of different colors and/or other different properties.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

FIGS. 1-5 show a pressure airlock 5 according to embodiments of the invention. The pressure airlock is preferably for use in connection with an inflator for inflating a standard pneumatic valve or a tire gauge for determining an air pressure from a standard pneumatic valve. A standard pneumatic valve as described herein preferably includes a valve stem 10 having exterior threads 20 and a valve core 30 that, when depressed, permits the ingress or egress of air into the tire or inflated object. Although the term "tire" is generally used herein to described the inflated object, the subject invention may be used in connection with any inflated object that includes a conventional valve stem 10.

Figure 2:
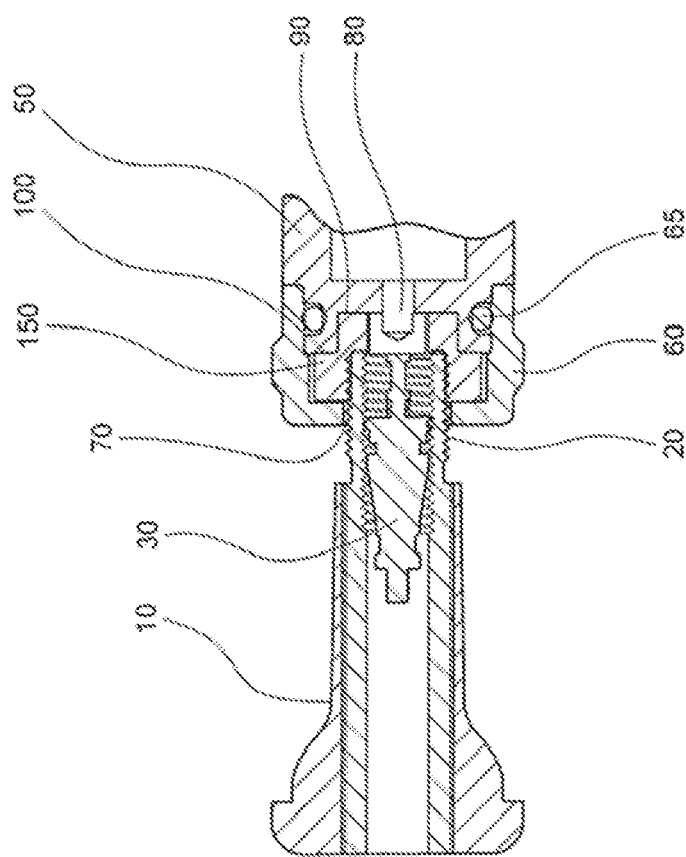
FIG. 2 is a cross-sectional side view of the Pressure Airlock shown in FIG. 1 taken along section 2-2.
Figure 1:
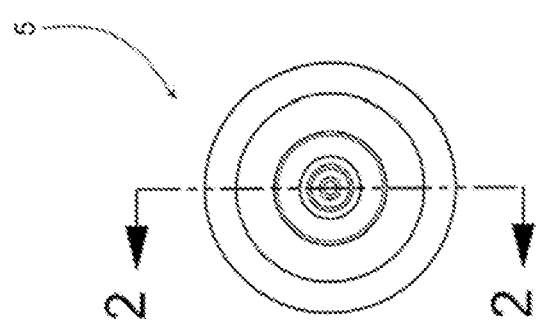
FIG. 1 is a front view of a Pressure Airlock Pressure Airlock, according to one embodiment of this invention.
Figure 4:
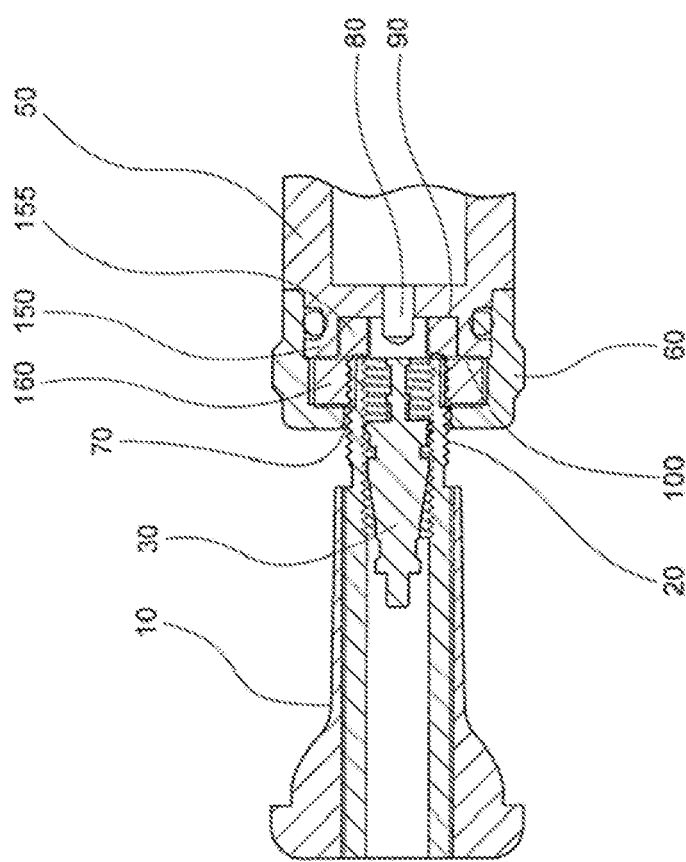
FIG. 4 is a cross-sectional side view of the Pressure Airlock shown in FIG. 3 taken along section 4-4.
Figure 3:
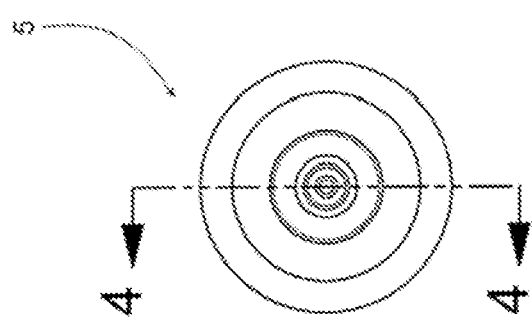
FIG. 3 is a front view of a Pressure Airlock Pressure Airlock, according to another embodiment of this invention.
Figure 5:
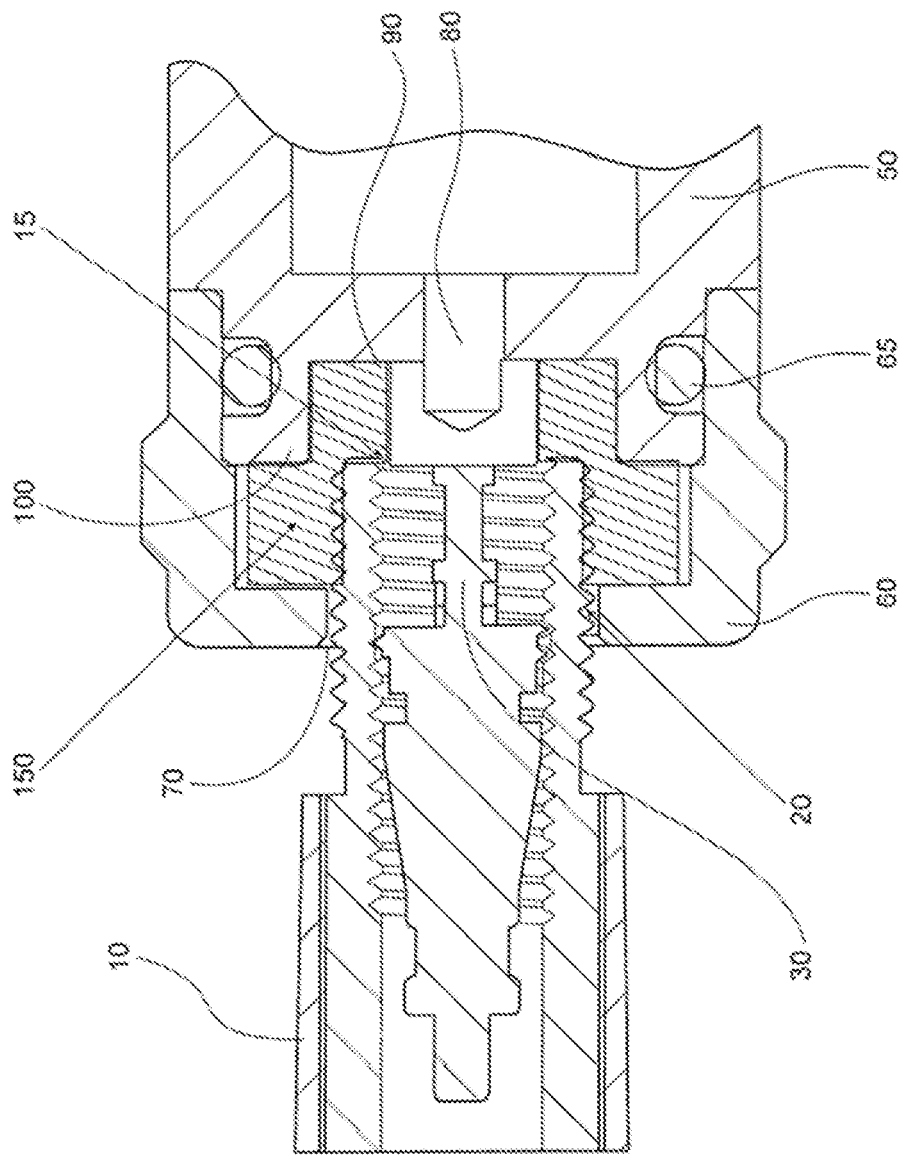
FIG. 5 is a close-up cross-sectional side view of the Pressure Airlock embodiment shown in FIG. 1.

FIGS. 1 and 2 show a cross-sectional and front view, respectively, of one embodiment of the pressure airlock. FIGS. 3 and 4 show a cross-sectional and front view, respectively, of a second embodiment of the pressure airlock. FIG. 5 shows a close-up of the pressure airlock shown in FIG. 1.

As best shown in FIG. 5, the pressure airlock includes a conduit 50 in fluid communication with the inflator or the gauge. The conduit 50 preferably permits the free flow of air between the inflator or gauge and the valve stem 10. The conduit 50, and indeed, the remaining operative "hard" portions of the pressure airlock may be formed of metal, plastic or any other durable material suitable for the described application.

A tip 60 preferably extends from the conduit 50. The tip 60 includes a bore 70 that permits engagement with the valve stem 10. As shown in the figures, an O-ring 65 may be positioned between the tip 60 and the conduit 50. The bore 70 preferably corresponds in size with the exterior threads 20 of the valve stem 10 to create a tight engagement between the pressure airlock and the valve stem 10. Alternatively, the tip 60 may be integrated into the conduit 50 as a unitary component without the O-ring 65.

A core depressor 80 is positioned within the bore 70. The core depressor 80 is preferably configured to engage with the valve core 30 of the valve stem 10 to permit inflation into the tire and/or permit a pressure reading from the tire. According to one embodiment, the core depressor 80 includes a diameter larger than a diameter of the corresponding valve core 30.

As shown in the figures, an inner shoulder 90 surrounds the core depressor 80. In one embodiment, the core depressor 80 extends beyond the inner shoulder 90 and toward the bore 70. In a preferred embodiment of the invention, the core depressor 80 is a suitable length so as the face 15 of the valve stem 10 is flush with the seal 150 before engagement of the core depressor 80 with the valve core 30, as shown in FIGS. 1 and 5. In this manner, a seal is formed between the seal 150 and the face 15 of the valve stem 10 before air is exchanged between the pressure airlock 5 and the valve stem 10. In this way, the "hissing" noise typically associated with filling or testing tires is avoided.

An outer shoulder 100 extends from the inner shoulder 90 to create a stepped configuration within the pressure airlock. The outer shoulder 100 preferably extends beyond the core depressor 80.

A seal 150 is positioned on the inner shoulder 90 and the outer shoulder 100 and extends within the tip 60. As described above, the tip 60 is positioned at an end of the pressure airlock and preferably forms a cavity between the outer shoulder 100 and an inner surface of the tip 60. As such, this cavity is preferably occupied, in part, by the seal 150.

The seal 150 preferably abuts a face 15 of the valve stem 10 and the exterior threads 20 when in an engaged position. In this manner, the pressure airlock will create a primary seal around the exterior threads 20 of the valve stem 10 prior to the valve core 30 being depressed, as well as a face seal on the face of the valve stem 10. This combination results in a better user experience, in which the valve core 30 can be depressed and the user will not have to maintain constant pressure on the gauge or inflator to make the seal.

As shown in FIGS. 1, 2 and 5, the pressure airlock may include a single piece seal 150. The seal 150 may be rubber, foam or any similar pliable material that creates a flexible airtight seal between surfaces.

As shown in FIGS. 3 and 4, the pressure airlock may include a two piece seal 150. As best shown in FIG. 3, a first piece 155 is positioned on the inner shoulder 90 and a second piece 160 is positioned on the outer shoulder 100. The first piece 155 may include different physical properties from the second piece 160, such as a different hardness, a different color, or other distinguishing characteristics that may be advantageous to a user.

While in the foregoing specification this invention has been described in relation to certain preferred embodiments thereof, and many details have been set forth for purpose of illustration, it will be apparent to those skilled in the art that the device and placard are susceptible to additional embodiments and that certain of the details described herein can be varied considerably without departing from the basic principles of the invention.

The invention claimed is:

1. A pressure airlock for an inflator or a gauge for use with a valve stem having exterior threads and a valve core, the pressure airlock comprising:
   a conduit in fluid communication with the inflator or the gauge;
   a tip extending from the conduit, in line with the conduit, the tip having a bore;
   a core depressor positioned within the bore;
   an inner shoulder defined by a portion of the conduit surrounding the core depressor, the core depressor extending beyond the inner shoulder;
   an outer shoulder defined by a portion of the conduit extending from the inner shoulder, the outer shoulder extending beyond the core depressor;
   a seal positioned on the inner shoulder and the outer shoulder and extending within the tip, wherein the seal abuts a face of the valve stem and the threads resulting in an engaged position.

2. The pressure airlock of claim 1 wherein the seal comprises a single piece seal.

3. The pressure airlock of claim 1 wherein the seal comprises a two piece seal, a first piece positioned on the inner shoulder and a second piece positioned on the outer shoulder.

4. The pressure airlock of claim 3 wherein the first piece includes different physical properties from the second piece.

5. The pressure airlock of claim 4 wherein the first piece includes a different hardness from the second piece.

6. The pressure airlock of claim 4 wherein the first piece includes a different color from the second piece.

7. The pressure airlock of claim 1 wherein the core depressor has a diameter larger than a diameter of the valve core.

8. The pressure airlock of claim 1 wherein an O-ring is positioned between the tip and the conduit.

9. The pressure airlock of claim 1 wherein the tip forms a cavity between the outer shoulder and an inner surface of the tip.

10. The pressure airlock of claim 1 wherein the bore corresponds in size with the exterior threads of the valve stem.

11. A pressure airlock for an inflator or a gauge for use with a valve stem having exterior threads and a valve core, the pressure airlock comprising:
    a conduit in fluid communication with the inflator or the gauge;
    a tip extending from the conduit, the tip having a bore, wherein the conduit and the tip are aligned along a common axis;
    a core depressor positioned within the bore, the core depressor having a larger diameter than the valve core;
    an inner shoulder surrounding the core depressor and abutting the conduit;
    an outer shoulder extending from the inner shoulder, the outer shoulder extending beyond the core depressor and abutting the conduit;
    a seal positioned on the inner shoulder and the outer shoulder and extending within the tip, wherein the seal abuts a face of the valve stem in line with the outer shoulder and wherein the seal abuts the threads resulting in an engaged position.

12. The pressure airlock of claim 11 wherein the seal comprises a single piece seal.

13. The pressure airlock of claim 11 wherein the seal comprises a two piece seal, a first piece positioned on the inner shoulder and a second piece positioned on the outer shoulder.

14. The pressure airlock of claim 11 wherein the core depressor extends beyond the inner shoulder.

15. The pressure airlock of claim 11 wherein air is exchanged between the pressure air lock and the valve stem via the core depressor after the seal and valve stem form the engaged position.

16. A pressure airlock for an inflator or a gauge for use with a valve stem having exterior threads and a valve core, the pressure airlock comprising:
    a conduit in fluid communication with the inflator or the gauge;
    a tip extending from the conduit, in line with an axis of the conduit, the tip having a bore;
    a core depressor positioned within the bore;
    a first seal adjacent to the conduit, wherein the first seal surrounds the core depressor;
    an inner shoulder where the first seal meets the conduit, wherein the core depressor extends beyond the inner shoulder
    a second seal adjacent to the first seal, wherein the second seal surrounds threads of the valve stem;
    an outer shoulder adjacent to the inner shoulder, wherein the outer shoulder is in line with a valve stem face, and wherein the outer shoulder extends beyond the core depressor.

17. The pressure airlock according to claim 16 wherein the outer shoulder defines a line of separation between the first seal and the second seal at the valve stem face.

* * * * *